Aug. 25, 1964  R. J. HOOKER  3,146,037
THRUST BEARINGS
Filed Jan. 25, 1963  8 Sheets-Sheet 1
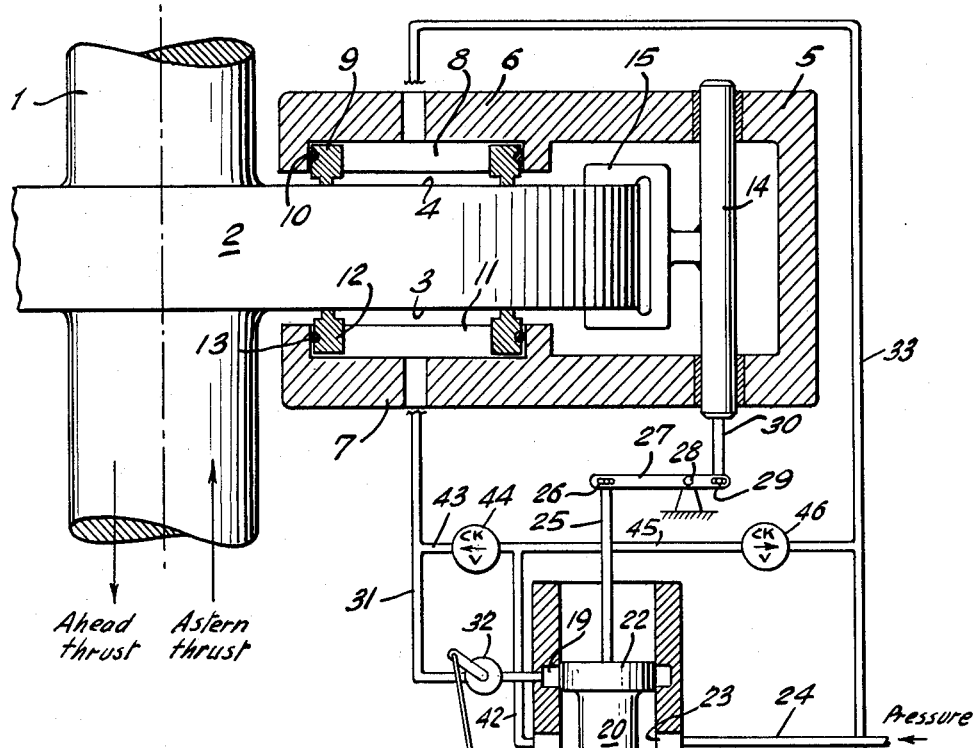
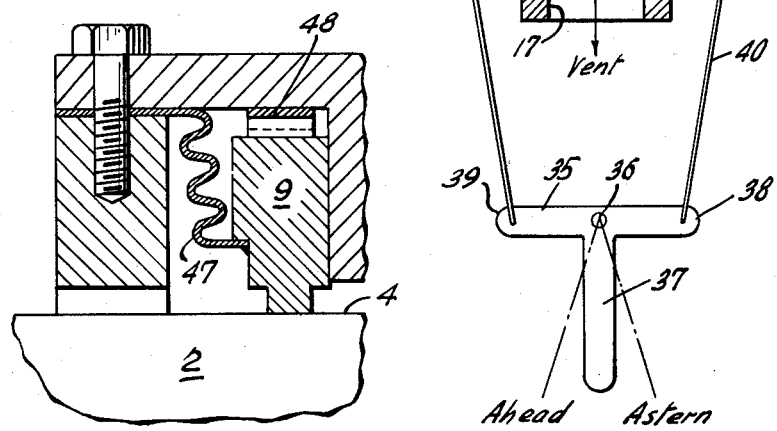

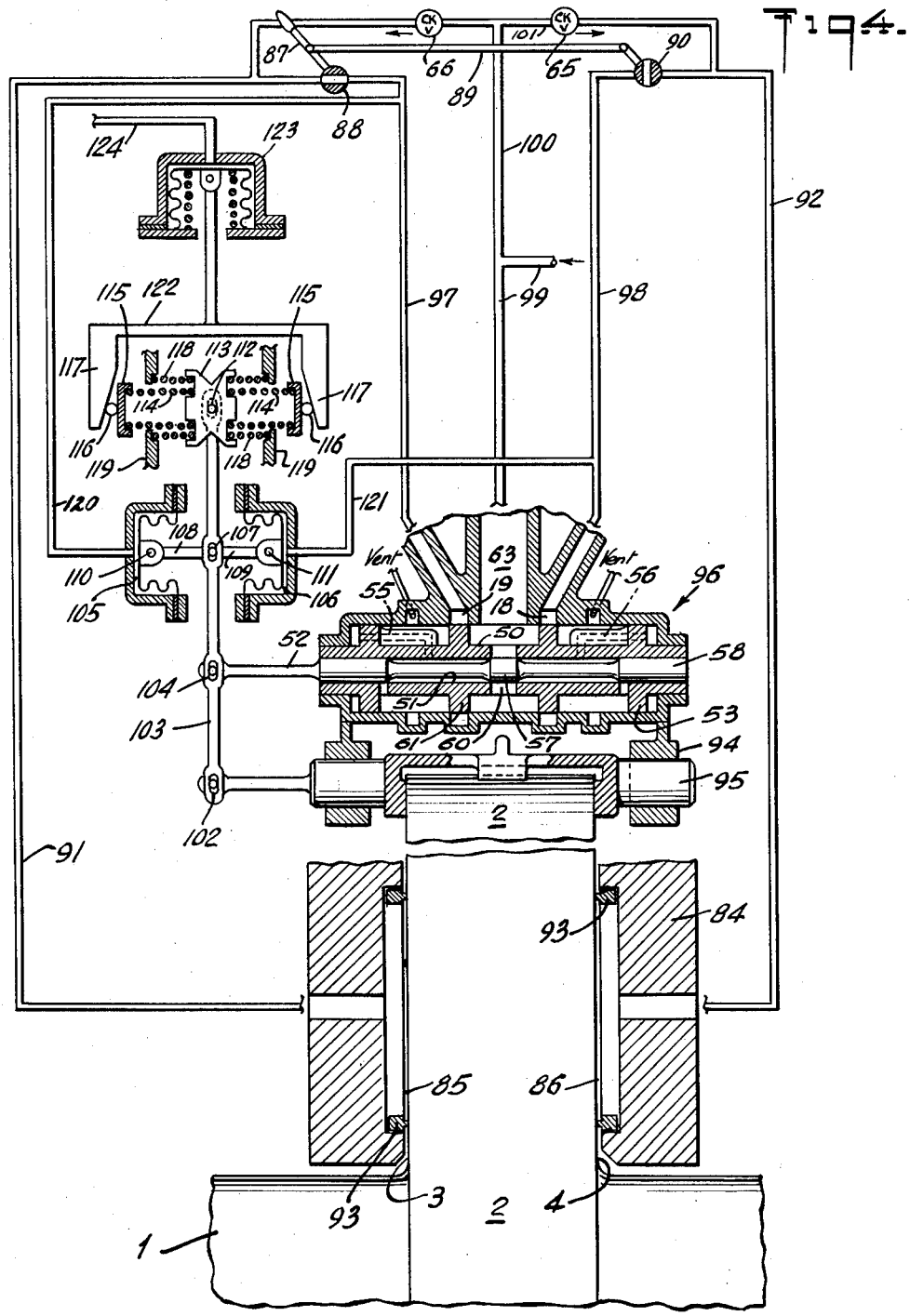

Aug. 25, 1964   R. J. HOOKER   3,146,037
THRUST BEARINGS
Filed Jan. 25, 1963   8 Sheets-Sheet 4
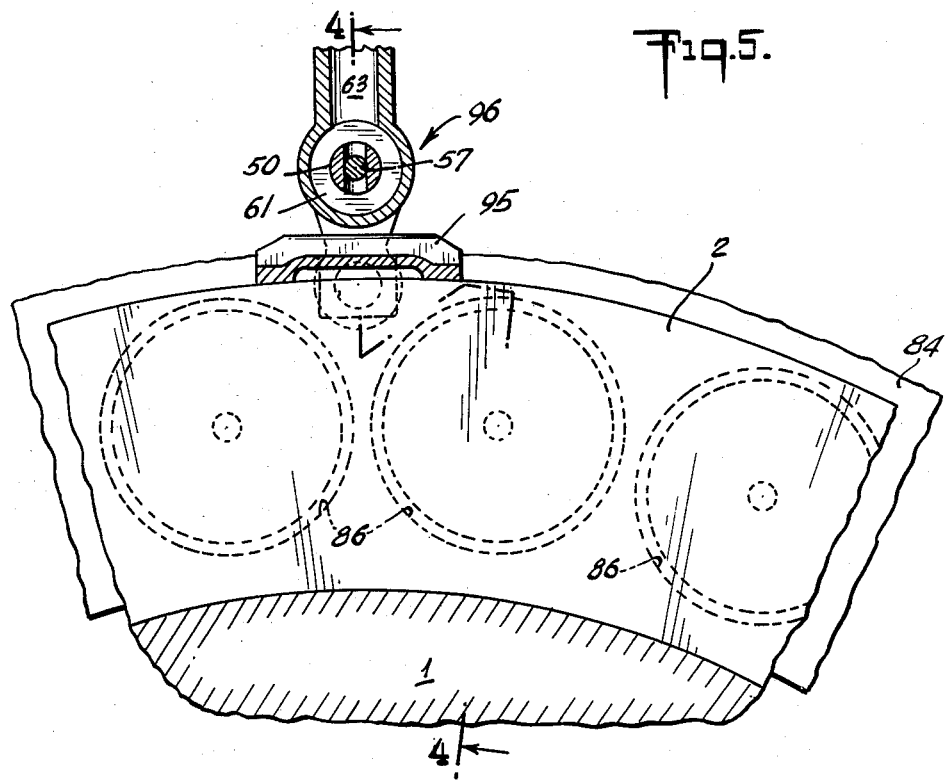
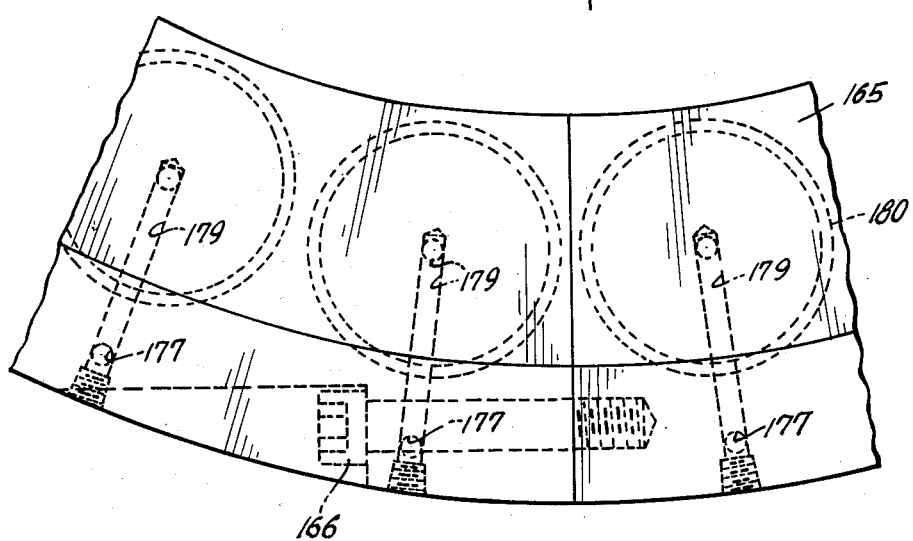

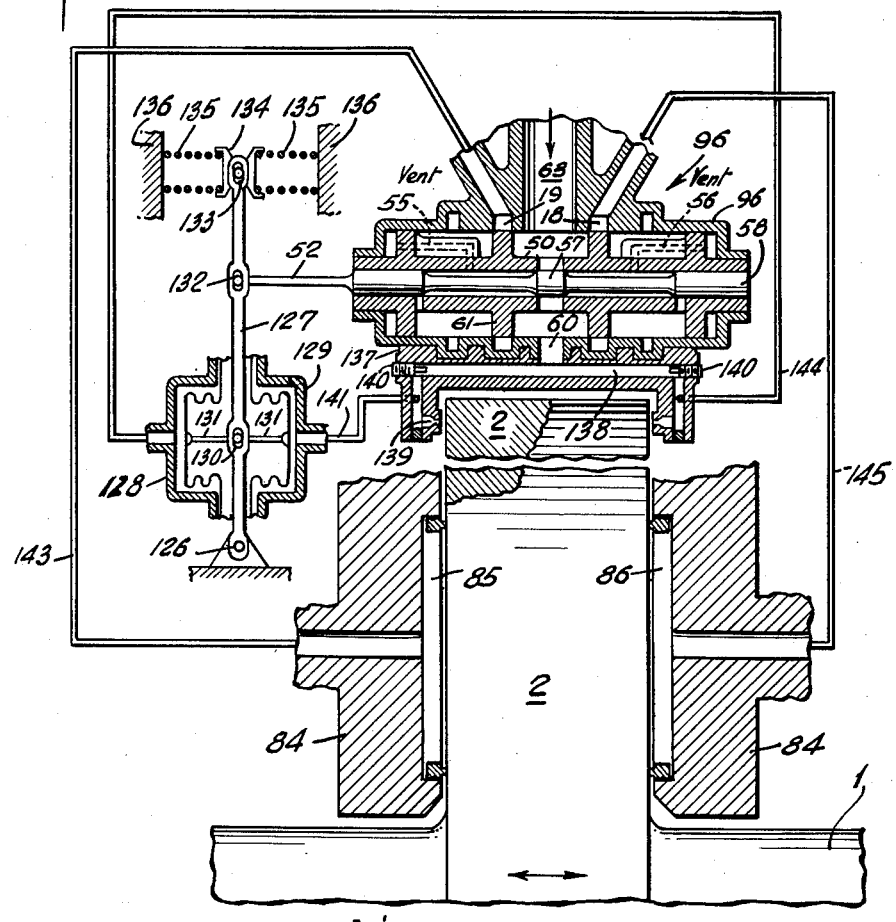
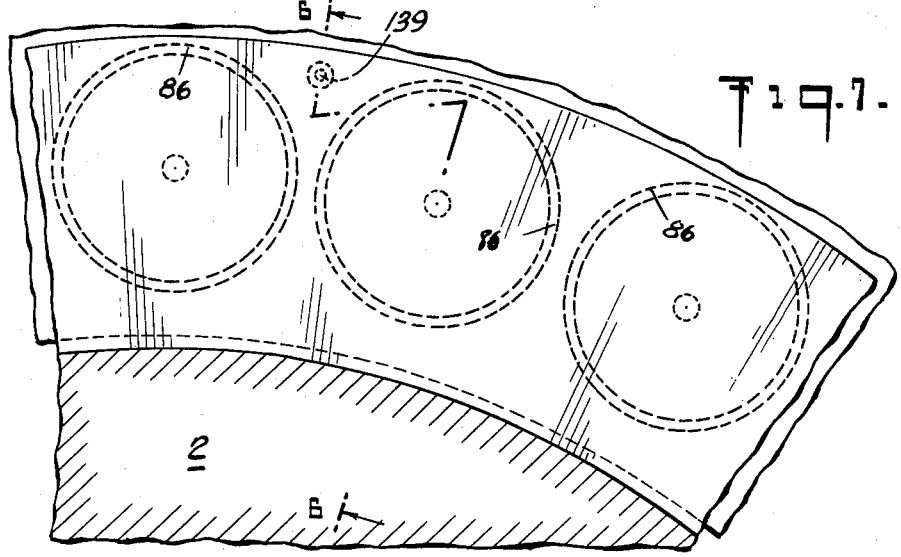

Aug. 25, 1964    R. J. HOOKER    3,146,037
THRUST BEARINGS

Filed Jan. 25, 1963    8 Sheets-Sheet 6

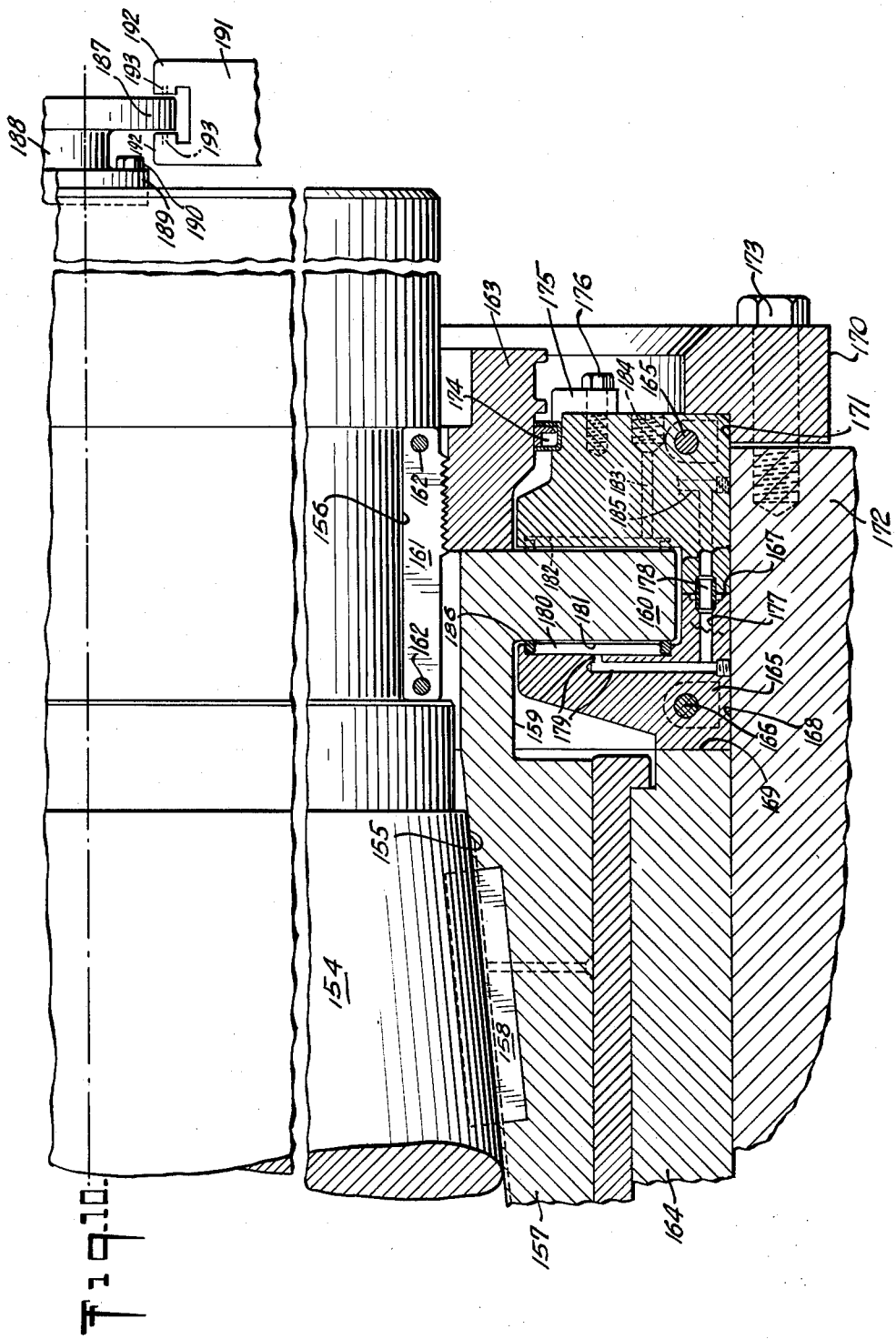

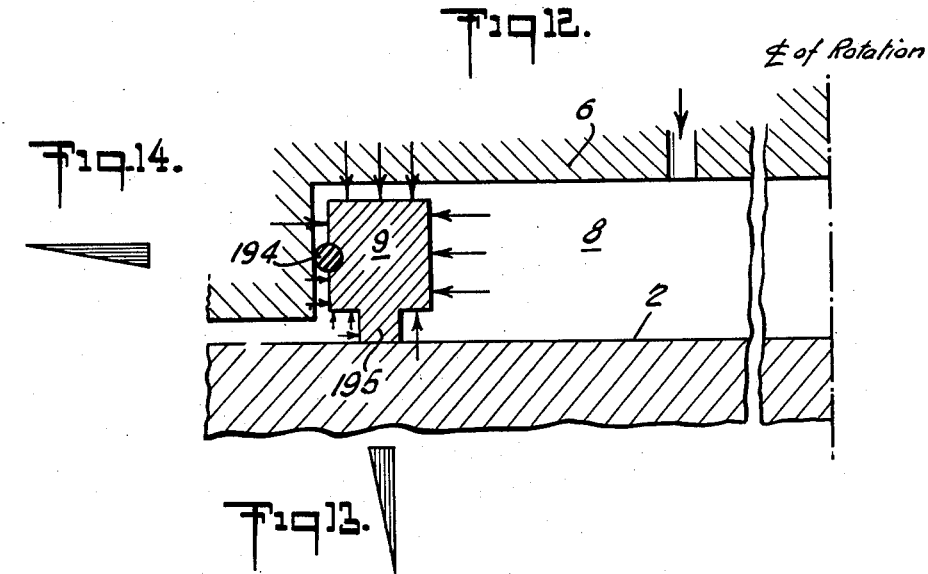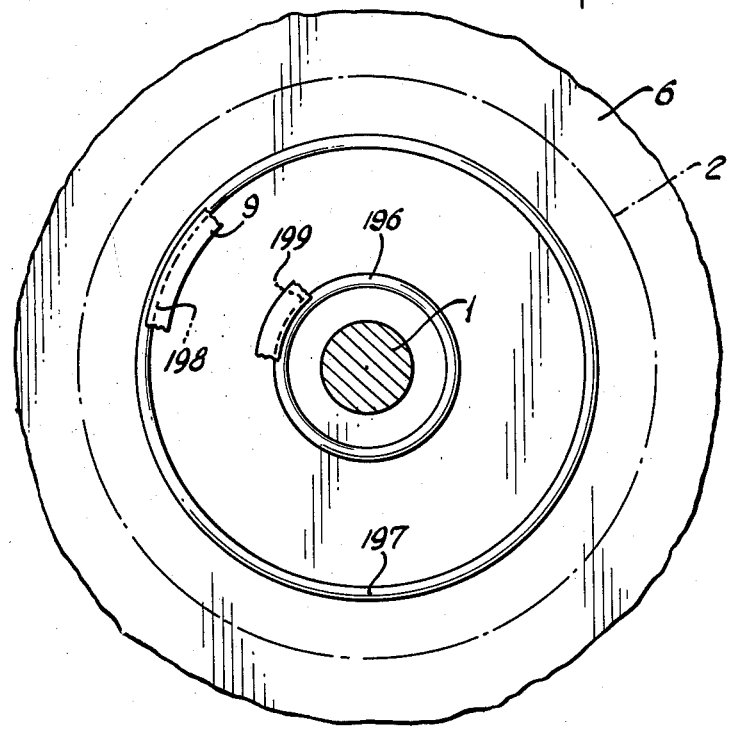

United States Patent Office 3,146,037
Patented Aug. 25, 1964

3,146,037
THRUST BEARINGS
Ralph J. Hooker, Schenectady, N.Y., assignor to Mechanical Technology Incorporated, Latham, N.Y., a corporation of New York
Filed Jan. 25, 1963, Ser. No. 253,836
24 Claims. (Cl. 308—9)

This invention relates to thrust bearings and particularly to a method and apparatus for resisting axially acting thrust forces on a rotatable member that is capable of limited axial movements.

Rotatable power shafts such as the propeller shafts of ships, turbine shafts, and the roller shafts of rolling mills, for example, are subject to axially acting thrust forces, often suddenly applied, which cause limited axial displacement of such rotating shafts.

An object of the invention is to provide a thrust bearing construction for a shaft, to oppose and counteract any axially acting, thrust forces applied to such shaft in both directions, with which such shaft will be normally held in a neutral, intermediate, equilibrium, position with respect to its axial displacements in both directions, with which the power loss due to friction in this thrust bearing will be exceptionally low, with which the running temperature of the bearing may be controlled during use, which will handle successfully, exceptionally high axial thrust forces on the shaft, which will safely carry heavy thrust loads for a short time if the supply of operating lubricating fluids should fail, which may employ any of various lubricating fluids including gas, steam, water, boiler feed, and oils, and which will be relatively simple, compact, practical, effective, efficient, durable and inexpensive in construction.

Another object is to provide an improved and relatively simple and practical method of automatically opposing and counteracting the axially acting, thrust forces to which a rotatable shaft may be subjected in use.

Other objects and advantages will appear from the following description of several embodiments and applications of the invention, and the novel features will be particularly pointed out hereinafter in connection with the appended claims.

In the accompanying drawings:

FIG. 1 is a schematic but simple illustration, partly in section, of the application of the invention as a thrust bearing for a propeller shaft of a ship;

FIG. 2 is a sectional elevation of a part of the bearing showing a modification of the sealing ring that may be employed in the bearing;

FIG. 4 is a schematic plan, partly in section, illustrating another embodiment of the invention, representing a section taken approximately along the line 4—4 of FIG. 5 plus added controls;

FIG. 5 is a fragmentary sectional elevation of a part of the bearing and the rotatable shaft or member as employed in the embodiment of the invention shown in FIG. 4;

FIG. 6 is a schematic plan, somewhat similar to that shown in FIG. 4, but showing a modification thereof using a hydrostatic control;

FIG. 7 is a view somewhat similar to FIG. 5, but as modified in the manner of FIG. 6;

FIG. 10 is a side elevation, partly in section, of one end of the shaft of a roller in a metal rolling mill, illustrating the manner in which this invention and the construction of FIG. 6 may be applied thereto;

FIG. 11 is an end elevation of a fragmentary part of the construction shown in FIG. 10;

FIG. 12 is a sectional elevation of a part of the bearing, on a larger scale, to illustrate the action of the sealing ring and certain features thereof;

FIG. 13 is a schematic diagram illustrating the fall of fluid pressure along that surface of the sealing ring which bears on the rotating member;

FIG. 14 is a schematic diagram illustrating the fall of fluid pressure along that surface of the sealing ring which bears on the side wall of the fluid pressure recess in which the seal is disposed; and FIG. 15 is an elevation of a portion of a face of the housing or support, with the sealing rings disposed in a recess and showing the use of rings that are concentric with the shaft.

Figure 3:
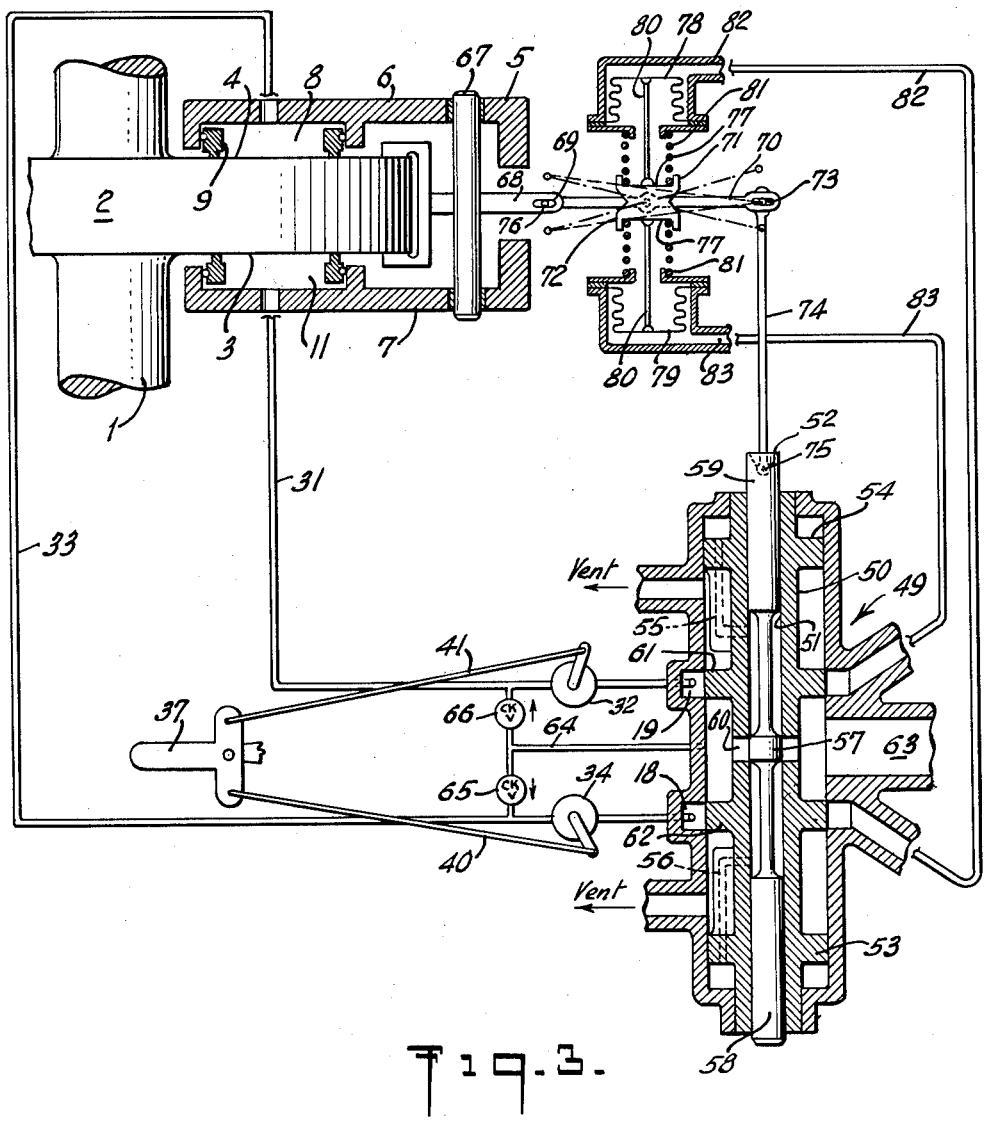
FIG. 3 is a schematic plan, partly in section, of a modification of the bearing shown in FIG. 1.

This invention employs a lubricating fluid applied under pressure against opposed faces of the shaft or rotating member that are approximately normal to the axis of rotation of the shaft, for opposing the action of axially directed, thrust forces to which the shaft may be subjected during its rotation, and for returning the shaft, upon its axial displacement in either direction due to thrust forces acting thereon, back to an intermediate, neutral or equilibrium position.

Referring first to the embodiment of the invention illustrated in FIG. 1, the shaft 1 or rotary member, which is subjected to axially directed thrust forces during its rotation, may be the propeller shaft of a ship, for example, and it receives such thrust forces when the ship is propelled forwardly or in a reverse direction, depending upon the direction of rotation of the shaft. This shaft is provided with a peripherally extending flange 2 which rotates with it, and the side faces 3 and 4 of this flange are planar faces that are approximately normal to the axis of rotation of the shaft. A support or housing 5 has a bifurcated portion that receives between its arms 6 and 7, the flange 2 at one side of the shaft. The arm 6 has a recess or cavity 8 on its face toward the flange 2 in which is disposed an annular ring 9 which has sliding engagement with the peripheral side wall of the cavity or recess 8. An O-ring 10 is disposed between the outer periphery of the ring and the peripheral wall of the recess, so that the ring may move into contact with the face 4 of the flange 2 while remaining slidingly sealed to the peripheral wall of the recess. The ring is preferably expandable against the peripheral wall of the recess in any suitable manner, such as split rings used on engine and pump pistons. The arm 7 has a similar recess or cavity 11 in its face toward the other side or face of flange 2, and a ring 12 with O-ring 13 similar to the ring 9 is disposed in recess 11 so as to slide into contact with the face 3 of the flange 2.

A slide 14 is mounted in the arms 6 and 7 just beyond the periphery of the flange 2 for reciprocating motion in directions parallel to the axis of rotation of the shaft 1 with its flange 2. This slide has a laterally extending arm 15 bifurcated at its free end which slidingly embraces the flange 2, so that any axial movement of the flange 2 with shaft 1 will impart a similar movement to the slide 14.

A reversing valve 16 is provided with a passage 17 having annular grooves 18 and 19, spaced apart, and arranged along and in the passage. A valve element 20 reciprocates along the passage 17 and has spaced lands 21 and 22 thereon of widths to bridge and close the grooves 18 and 19 when in alignment therewith. The spacing between the lands 21 and 22 is the same as that between the grooves 18 and 19. A port 23 opens into the passage 17 approximately midway between the grooves 18 and 19 and port 23 is connected by pipe 24 to a source of lubricating fluid under pressure, not shown. The valve element 20 has an operating rod 25 extending endwise from the housing of the valve and the outer or free end of this rod is connected by a pin and slot pivotal connection 26 to one end of a lever 27 that is pivoted intermediate of its ends on a fulcrum 28. The other end of this lever is pivotally connected by a pin and slot connection 29 to an extension 30 of the slide 14. This pin and slot pivotal connection between reciprocating members and levers is a common expedient and hence they are not illustrated or described in detail. When the slide 14 is reciprocated by the axial displacement of the flange 2, it transmits this movement to the valve element 20. The position of the fulcrum 28 along the lever 27 is selected to provide the desired amplification of the motion of flange 2 in its effect on the valve element 20.

A conduit 31 connects the annular groove 19 of the valve 16 with the recess 11 at one side of the flange 2, and intermediate of its ends it is controlled by a valve 32. Another conduit 33 connects the other annular groove 18 of the valve 16 with the recess 8 at the other side of the flange 2, and intermediate of its ends this conduit is controlled by a valve 34. A direction control lever 35 for the shaft 1 is pivoted at 36 and has an operating handle 37 and two arms 38 and 39. One of these arms 38 is connected by a link 40 to the operating handle of the valve 34, and the other of these arms 39 is connected by a link 41 to the operating handle of the valve 32, so that when the handle 37 is in an intermediate position, shown in full lines in FIG. 1, it will hold valves 32 and 34 in closed positions. When handle 37 is moved to the left in FIG. 1, it will operate valve 32 to open it, and move valve 34 without opening it. The handle 37 controls the mechanism (not shown) for causing rotation of the shaft 1 in opposite directions. When handle 37 is moved to the left in FIG. 1, as just explained, it sets in motion means (not shown) that causes rotation of propeller shaft 1 in a direction to cause a forward movement of the shaft 1, and when rotation starts thrust forces will act upon the shaft in the opposite direction from the movement of the ship. These axial thrust forces acting on the shaft will cause a small, limited displacement of the shaft with its flange 2.

This axial movement of the shaft 1 and its flange 2 will be transmitted to the slide 14, and by it through the lever 27 to valve element 20. When valve element 20 moves upwardly in FIG. 1, its land 22 will uncover somewhat the groove 19 and its land 21 will uncover somewhat the groove 18. The lubricating fluid under pressure may now pass from said source through conduit 24, valve 16 between the lands 21 and 22, and conduit 31 to recess 11. The fluid under pressure in recess 11, being confined in the recess, will exert a pressure against the face 3 of the flange 24 urge it and member 1 upwardly in FIG. 1 which is in opposition to the thrust forces that caused the initial axial displacement of the rotatable member and its flange 2. Some of the fluid in the recess 11 will leak past the ring 12 and lubricate the bearing surfaces of the ring 12 on the flange 2, as well as carry off any heat of friction that may be created by the sealing contact of the end face of the ring with the flange 2. The fluid pressure in the recess urges the ring continuously into contact with the rotating flange 2.

If the control handle 37 is moved in the opposite direction, such as to the right of the full line position in FIG. 1, to cause an operation of shaft 1 in the opposite direction, the valve 32 will be closed and valve 34 opened, so that the fluid under pressure will be delivered to the recess 8 and press the flange 2 downwardly in opposition to the thrust forces now acting upwardly (FIG. 1) on the shaft 1 in the opposite axial direction due to reversal of direction of rotation of shaft 1. The upwardly acting (FIG. 1) thrust forces on shaft 1 cause an axial displacement of shaft 1 and its flange 2, and this displacement was transmitted through slide 14, lever 27 and rod 25 to valve element 20 which moved the latter downwardly to uncover grooves 18 and 19 in the opposite direction. Lubricating fluid under pressure from said source would then pass through valve 16, groove 18, valve 34 and conduit 33 to the recess 8 where it presses the flange backwardly to its initial, intermediate position and holds it there.

In order to provide small movement of the lubricating fluid through the recess not under full pressure at any time, for leakage past its sealing ring to lubricate it, and to carry off heat generated in that recess by the friction of the flange with the body of fluid in that recess, a conduit 42 is connected continuously to the fluid under pressure, from conduit 24, such as through the housing of valve 16 between the lands 21 and 22. This conduit 42 has one branch 43 that leads through a restricted flow, free check valve 44 to conduit 31 between the valve 32 and the recess 11. It opens freely towards the conduit 31 and closes automatically to prevent reverse flow. The other branch 45 leads to the conduit 33 between the valve 34 and the recess 8, and has in it a restricted flow, free check valve 46 that opens to pass fluid from conduit 42 to conduit 33 and closes automatically to prevent reverse flow. These check valves 44 and 46 provide for continuous delivery of the lubricating fluid to both recesses 8 and 11, but only at a slow rate such that the fluid pressure in each recess will never be as great as when valve 32 or 34 is open. These restricted check valves provide in any recess 8 or 11, just enough pressure when that recess is cut off by its main valve 32 or 34 from full pressure of the lubricating fluid, to provide a small fluid leakage past the sealing ring 9 or 12 in that recess to lubricate and cool it and slowly renew the body of lubricating fluid in that recess.

It will be apparent from the foregoing that whenever axial thrust forces are created on the shaft during its rotation, the limited axial displacement of the shaft and its flange by such forces will operate the valve 16 to cause delivery of lubricating fluid under full pressure to that one of the recesses 8 and 11 which will yieldingly move the shaft 1 and its flange 2 back into its initial intermediate position, and as the flange 2 moves into its intermediate or initial position, it acts through the slide 14 and lever 27 to move the valve element 20 into its initial, neutral or intermediate position in which delivery of lubricating fluid to a recess for returning the flange 2 to such initial position is discontinued. The device is therefore automatic, upon axial displacement of the shaft under thrust forces in either direction, to counteract such thrust forces and return the shaft axially to its intermediate or initial position and hold it there, while passing enough fluid at all times to keep the sealing rings lubricated and the body of fluid in the recesses cool.

In FIG. 2, one or both of the sealing rings 9 and 12 instead of having an O-ring seal with the peripheral wall of the recess, has a bellows 47 connecting the outer periphery of the sealing ring to the inner end of the recess, in which case the ring need not bear against the peripheral side wall of the recess. In such cases it may be advantageous to provide a corrugated or linearly undulatory spring ring 48 compressed between and connected to the inner or bottom wall of each recess and the inner end of the ring, for urging the ring continuously into contact with the flange 2.

In the embodiment of the invention shown in FIG. 3, the shaft 1, flange 2, support 5, arms 6 and 7, recesses 8 and 11 and sealing rings 9 and 12 are the same as described above for FIG. 1. The conduits 31 and 33 with valves 32 and 34 therein respectively, are also the same as for FIG. 1 except that valve 16 is replaced by a valve 49 which has an outer casing generally similar to that of valve 16 with spaced apart annular grooves 18 and 19 connected respectively to the conduits 33 and 31 through the valves 34 and 32. The valves 32 and 34 are operated by a control handle 37 through links 40 and 41. The valve element 50 of valve 49 has a cylindrical passage 51 from end to end thereof and in which a pilot valve element 52 fits and reciprocates endwise. This valve element 50 also reciprocates endwise in the valve housing and is fluid operated in its reciprocations. To accomplish this, the valve element 50 has additional lands 53 and 54 near its ends, and the ends of the housing are closed but provided with passages therethrough in which the ends of the valve element 50 reciprocate.

The element 50 has passages 55 and 56 near its opposite ends that lead from the passage 51 to the ends of the housing beyond the lands 53 and 54. The pilot element 52 has a central land 57, and also end lands 58 and 59 that are spaced from the central land 57. The central land 57 normally closes a port 60 that opens into the space between the lands 61 and 62 that normally close the ports to the annular grooves 18 and 19. The conduit 63 that leads to a source (not shown) of the lubricating fluid under pressure is continuously connected to the space between the lands 61 and 62. The spaces in the housing of the valve between lands 54 and 61 and between lands 53 and 62 are continuously vented as shown. The space in the valve housing between lands 61 and 62 which is continuously connected to conduit 63 is connected by a pipe 64 to the conduits 31 and 33 through restricted flow, free check valves 65 and 66 that open only to pass fluid towards conduits 31 and 35 and prevent flow in the reverse directions.

A slide 67 is mounted for reciprocation in the support 5, and has a bifurcated arm that receives the marginal portion of the flange 2 so that when the flange is displaced in a direction parallel to its axis of rotation, it will cause linear endwise movements of the slide. The slide has an arm 68 extending in a direction away from the flange and at its free end has a slot 69 elongated in a direction radial to the axis of rotation of the flange 2. A lever 70 is pivoted at 71 intermediate of its ends to a shiftable fulcrum support 72, and at one end is pivoted by pin 73 to one end of a link 74, whose other end is pivoted at 75 to one end of the pilot valve element 52. The other end of lever 70 carries a pin 76 which slides and pivots in the slot 69. The fulcrum support 72 has opposed faces 77 by which it is adjustably held. Disposed at opposite sides of the fulcrum support are bellows motors 78 and 79, the movable parts of which are connected by links 80 to opposite sides of the fulcrum support 72. A spring 81 acts between a rigid head for each motor and the adjacent face 77 of the fulcrum support so as to urge the fulcrum support resiliently into an intermediate position, as shown. The bellows motor 78 is connected by a conduit 82 to the annular groove 18 of the valve housing, and bellows motor 79 is connected by a conduit 83 to the annular groove 19 of the valve housing.

The embodiment of the invention illustrated in FIG. 3 operates in the manner next described. Assume, for example, that the shaft 1 is a propeller shaft of a ship, and its rotation in one direction or the other is controlled by the handle 37 as explained in connection with FIG. 1. When handle 37 is operated to cause rotation of shaft 1 in a direction to propel the ship forwardly, the action of the propeller on the water will produce a thrust force on the shaft in an axial direction which causes a small, limited, axial movement of the shaft, downwardly in FIG. 3. The flange 2 on the shaft 1 moves downwardly in FIG. 3 and it operates the slide 67, and through it the lever 70, and through it the pilot valve element 52 upward in FIG. 3. At this time the fulcrum of the lever remains stationary since no pressures have been placed on the means to shift the fulcrum. The land 57 uncovers port 60 and passes lubricating fluid under pressure from the supply pipe 63 downwardly in FIG. 3, through conduit passage 56 below land 53 where it acts on the land 53 and pushes the larger or relay valve element upwardly so that its land 62 uncovers port 18 and its land 61 uncovers port 19. This passes the fluid under pressure through conduit 31 to the lower recess 11 toward which the flange 2 moved with the shaft 1 under the action of the thrust forces. The uncovering of port 18 did not vent the pipe 33 that leads to the other recess 8 at the opposite side of the flange 2 because the valve 34 was closed. This causes exertion of a large fluid pressure on the flange 2 through recess 11, which forces flange 2 and shaft 1 backwardly, which is upwardly in FIG. 3. As this happens the lever 70 is rocked to return pilot valve element 52 to its neutral or intermediate position in which its land 57 again covers port 60 which terminates passage of high pressure fluid to recess 11 and hence terminates the creation of high pressure in recess 11.

Concurrently with the exertion of high pressure in recess 11, the bellows motor 79 moves upwardly under increased pressure on it from pipe 83, moving the fulcrum 71 of the lever 70 upwardly tending to close the pilot valve and shut off the flow of fluid to recess 11 in anticipation of its complete movement to its neutral or initial position, and thus prevent overshooting of the movement of flange 2. In case that the anticipated early cut off was not exact and the flange 2 moved beyond its neutral position, the flange 2 would momentarily cause rocking of lever 70 in the opposite direction to apply fluid pressure to return the flange to its neutral position.

In the embodiment of the invention illustrated in FIGS. 4 and 5, the rotatable shaft 1 and its peripheral flange 2, both subject to end thrust forces, are as explained in connection with FIG. 1, except that in FIGS. 3 and 4, the support 84 has a plurality of individual cavities or recesses 85 in its face, in a circular row along the face 3 of the flange 2, and a plurality of individual recess or cavities 86 in its face in a circular row along the face 4 of flange 2, instead of a single recess or cavity facing the flange as in FIG. 1. Each recess or cavity 85 corresponds in function to cavity 11 in FIG. 1 and each recess or cavity 86 corresponds in function to the cavity 8 in FIG. 1.

Control of the rotation of the shaft 1 is by handle 87 connected to and operating valve 88 that corresponds to valve 32 of FIG. 1, and also connected by link 89 to the handle of valve 90 that corresponds to valve 34 of FIG. 1. A conduit 91 connects valve 88 to each of the recesses or cavities 86, and a conduit 92 connects valve 90 to each of the recesses or cavities 86. An annular sealing ring 93 is provided in each of the cavities or recesses 85 and 86, and constructed and functioning to seal against the faces of the flange 2 in the manner disclosed in connection with FIGS. 1 and 2. A support 94 is disposed along the margin of the flange 2 and at one side of the flange it mounts a pickup slide 95 for linear sliding movement in a direction parallel to the axis of rotation of the shaft 1. This slide 95 has a forked intermediate portion that embraces the edge of flange 2, so that when shaft 1 with its flange 2 is displaced in an axial direction, it will cause displacement of the slide 95 in a parallel direction and by an equal movement.

A fluid control valve 96 is carried by the same support 94, and it is constructed in the same manner as valve 49 of FIG. 3, and parts in FIGS. 4 and 5 of this valve corresponding to similar valve parts in FIG. 3 are designated by the same reference characters. The groove 19 is connected by conduit 97 to valve 88, and groove 18 is connected by conduit 98 to valve 90. Lubricating fluid under pressure is delivered continuously by conduit 99 to the supply pipe 63 and also by conduit 100 to pipe 101 and through the check valves 65 and 66 to conduits 91 and 92 which lead to the recesses 85 and 86 at opposite sides of the flange. The free check valves 65 and 66 are in the pipe 101 to pass lubricating fluid at a low restricted rate continuously to pipes 91 and 92, respectively, and function as do the valves 65 and 66 of FIG. 3.

The pickup slide 95 is pivotally connected by a pin and slot connection 102 to one end of an arm 103, and the pilot valve element 52 is pivotally connected by a pin and slot connection 104 as shown to the arm 103. The arm 103 extends between two oppositely acting bellows motors 105 and 106 and there is connected by a pin and slot connection 107 to links 108 and 109 that are pivotally connected at 110 and 111 respectively to the movable elements of the bellows motors. The arm 103 extends beyond the bellows motors 105 and 106 to its fulcrum end where it is pivotally connected by a pin and slot connection 112 to a fulcrum block 113. Helical springs 114 are disposed under compression between opposite faces of the block 113 and adjustable base elements 115, each of which has a cylindrical bar 116 on its outer face. A bias control cam 117 is disposed adjacent each bar 116 and is individually mounted for adjustment back and forth in directions to vary the pressure on the springs 114. A second spring 118 is disposed at each side of block 113, concentric with and adjacent to spring 114 and confined under a selected pressure between block 113 and stationary abutments 119. A pipe 120 connects the pressure chamber of bellows motor 105 to the pipe 97 between the valve 88 and the valve 96, and a pipe 121 connects the pressure chamber of bellows motor 106 to the pipe 98 between the valve 90 and the valve 96.

While the cams 117 may be operated separately in response to various control factors, in the example illustrated, the two cams 117 are connected together by a common element 122, which is operated by a bellows motor 123 that is responsive to some variable factor such as the depth of immersion of a submarine in which this thrust control is incorporated. The conduit 124 leading to the bellows motor 123 is connected to a pressure responsive device, not shown, such as a Pitot tube or other pressure responsive device. The depths to which a submarine may be immersed at any time will affect the end thrust forces on the propeller, and as the depth pressure increases the cams 117 will move in directions to increase the pressure of the springs 114 on the fulcrum element 113, so that higher fluid pressures can be built up in the recesses 85 and 86.

The operation of the embodiment of FIGS. 4 and 5 will be similar to that explained for FIG. 3 except that the bellows motors are separate from the floating fulcrum of the control lever.

In the embodiment of the invention shown in FIGS. 6 and 7, the shaft 1 with its peripheral flange 2 is controlled as explained in connection with FIGS. 1, 3, 4 and 5, and it has the annular row of recesses 86, and sealing rings in each recess, as in FIGS. 4 and 5, but the mechanical shaft position pickup of FIGS. 4 and 5 is replaced by a hydraulic one. The pilot controlled relay valve is the same as the one employed in FIGS. 4 and 5 and the same parts have the same reference numerals. In this embodiment the fulcrum 126 of the control lever 127 is fixed or stationary. The arm 127 extends between bellows motors 128 and 129 that correspond in function to bellows motors 105 and 106 of FIG. 4, and has a pin and slot connection 130 to the links 131 that are connected to and operated by the movable elements of the bellows motors. The arm 127 has a pin and slot connection 132 to the pilot valve element 52 and at its free end it has a pin and slot connection 133 to a bias block 134. Springs 135 at opposite sides of the block 134 are compressed between the block and abutments 136 and urge the free end of the arm 127 yieldingly into a neutral or intermediate position in which the pilot valve element 52 is in its neutral or intermediate position.

In place of the mechanical slide pickup of motion of the flange 2, a hydraulic pickup is employed. The support 137 which may be integral or connected to the housing of valve 96 has a passage 138 leading from port 60 of the valve to opposite sides of the flange 2. At each side of the flange 2 each end of the passage 138 terminates in a restricted orifice 139 opening towards and in proximity to the adjacent side face of the flange 2. Spaced from the orifice of each end of passage 138 is an adjustable flow restriction 140. The lubricating fluid under pressure from source pipe 63 will pass continuously through passage 138 and be directed continuously in restricted streams against opposite faces of flange 2. The fluid pressure will fall between each restriction 140 and the adjacent orifice 139, and if the opening in either orifice is varied the fluid pressure in that portion of the passage 138 between the orifice with its varied opening and its adjacent restriction 140 will vary. As the flange 2 moves toward and from either orifice 139 during axial displacement of the shaft while in close proximity to the orifice, it will affect the rate of escape of the fluid from the orifice, and thus have the same effect as an actual variation in the size of the orifice. This causes a change in the pressure fall of the fluid in passing from a restriction 140 and the effective change in the adjacent orifice. A conduit 141 is connected to one part of passage 138 between one restriction 140 and its adjacent orifice 139 to one of the bellows motors, such as motor 129, and a conduit 144 connects a corresponding part of passage 138 between the other restriction 140 and its adjacent orifice 139 to the other bellows motor 128. If flange 2 is axially displaced to the left in FIG. 6 under the action of thrust forces on shaft 1, the approach of flange 2 towards the left orifice 139 will restrict the discharge of fluid from that left orifice and hence the fluid pressure will build up in the left part of the passage 138 between its restriction 140 and the left orifice. This increased pressure will be conveyed to bellows motor 129 and cause rocking of arm 127 in a counterclockwise direction. This will operate pilot valve element 52 to the left in FIG. 6 and, as explained in connection with FIGS. 4 and 5, this will cause operation of the relay valve 96 to deliver lubricating fluid under pressure from source conduit 63 by pipe 143 to the recess 85. This exerts a fluid pressure force against a face of flange 2 urging the flange back toward its neutral or intermediate position. A similar response occurs if flange 2 is displaced axially in the opposite direction, in which case fluid under pressure passes through pipe 144 to the other bellows motor 128 and causes operation of arm 127 in a clockwise direction to move pilot valve element 52 to the right in FIG. 6 and cause delivery of fluid under pressure by pipe 145 to the other recess. This would cause exertion of a fluid pressure on the flange 2 for returning the flange 2 and shaft 1 in the opposite direction back to their neutral or intermediate positions.

Figure 8:
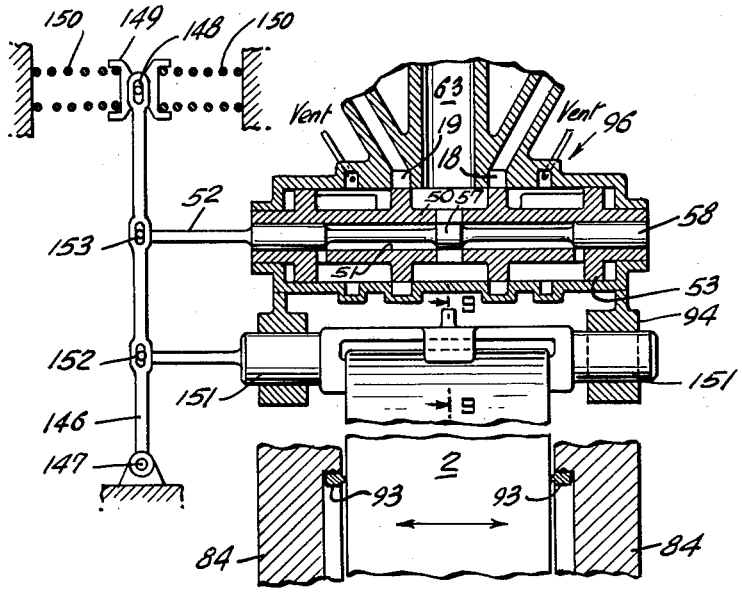
FIG. 8 is a schematic, sectional elevation of details of a mechanical pick-up for operating a pilot valve.
Figure 9:
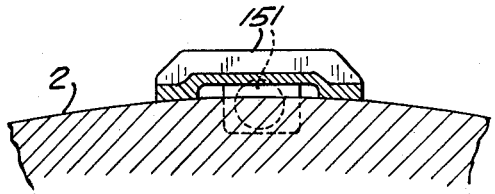
FIG. 9 is a sectional elevation of a part of the construction shown in FIG. 8, the section being taken approximately along the line 9—9 of FIG. 8.

In the construction shown in FIG. 8, a mechanical slide pickup replaces the hydraulic pickup control of FIG. 6. The arm 146 is pivoted at 147 to a fixed support, and its free end is connected by a pin and slot connection 148 to a block 149 against opposite faces of which springs 150 act to bias the arm yieldingly to a neutral position in the same manner that arm 127 of FIG. 6 was biased by spring 135. A mechanical slide pickup element 151, similar to pickup element 95 of FIG. 4, is connected by a pin and slot connection 152 to the arm 146. The pilot valve element 52, like element 52 of FIG. 6, is connected by a pin and slot connection 153 to the arm 146 so that operation of the arm 146 by the pickup element 151 will cause operation of pilot valve element 52 to cause relivery of fluid under pressure against the flange 2 to return it and its shaft to neutral or intermediate positions, as explained for FIG. 6.

In the embodiment shown in FIGS. 10 and 11, the control is applied to the shaft of a roller of a metal rolling mill, which is also subject to limited axial displacement under axial thrust forces created on the rolls in the rolling operations. In FIG. 10 one end portion of the roller shaft 154 has a slightly tapered periphery 155, and outwardly beyond it an annular groove 156. A sleeve 157 with a tapered interior passage that conforms in taper to that of the roll shaft, fits and telescopes over the tapered periphery 155 of the shaft, and is keyed to the shaft 154 for rotation therewith as by key 158. The sleeve 157 at its outer end has an annular groove 159 and then a flange 160 which corresponds functionally to the flange 2 of FIGS. 1–9. A split ring 161 surrounds the end of the shaft 154 in the groove 156, and the halves of this ring 161 are coupled together by bolts 162. The periphery of this ring 161 is threaded, and a nut 163 is threaded upon the periphery of ring 161 and abuts endwise against the flanged end of the sleeve 157, so as to hold the latter firmly in fitting contact of the correspondingly abutting, tapered surfaces of the sleeve and the shaft end portion.

The housing 164 of the roll bearing at this one end of the roll, includes at its free end a ring member 165 which is split diametrically, with its halves coupled to another by countersunk screws 166 (see FIG. 11) so as to encircle flange 160. This member 165 is also split at 167 in a plane perpendicular to the axis of rotation of the flange 160 at that flange. These sections of member 165 are received in an annular recess 168 of the housing and are confined together and against an internal shoulder 169 of the housing recess by a ring 170 which has a rabbet 171 in a corner thereof to receive and fit a corner of the outer section of the member 164. The ring 170 is secured against an end face of a housing part 172 by machine screws 173, and by the walls of its rabbet 171 it confines together the sections of the ring 165 that surrounds the flange 160. A suitable ring seal 174 is confined between the periphery of the nut 163 and the inner periphery of the outer end section of the split ring 165. This seal is removably confined in this sealing position by a plurality of lugs 175, one only being shown, that are secured by machine screws 176 to the outer end face of the split ring 165.

At the split 167 between the two sections of the ring 165 there is a passage 177 across the split normal to the abutting faces of the sections, and a sleeve or tube 178 is fitted snugly in this passage at both sides of the split to bridge the split 167 and prevent fluid leakage from the passage through the split. One end 179 of this passage 177 leads to and opens into a recess 180 in that face 181 of the axial inner ring section of ring 165 which is toward a face of flange 160. The other section of ring 165 has a recess 182 in its face toward the opposite side of the flange 160, and a conduit 183 connects that recess to the outer end face of that ring section where it is enlarged and threaded internally as at 184 for the coupling thereto of a pipe, not shown, which leads to the fluid control valve as explained in connection with FIGS. 1–8. The other half of passage 177 has a branch 185 that leads to an enlarged and internally threaded opening, not shown, but similar to opening 184, in the outer end face of ring 165 for connection to a pipe (not shown) leading to a fluid control valve. These conduits 183 and 185 from the recesses 181 and 182 in the ring correspond, for example, to conduits or pipes 143 and 145 of FIG. 6. Each recess 181 and 182 has a sealing ring 186 in it, corresponding in construction and function to the sealing rings 9 and 12 of FIG. 1, but which may be similar to the sealing ring 9 shown in FIG. 2.

In the construction shown in FIG. 10, it is difficult to find space in close proximity to the flange 10, in which the axial displacement pickup can be placed, but this pickup can be placed somewhere else on the roll shaft. Accordingly a disc 187 is disposed at the free end wall of the roll, concentrically with the axis of rotation of the roll. This disc has a hub 188 which in turn has a flange 189 that is secured to the end of the roll by machine screws 190, so that the disc 187, radially outwardly from its hub, is a flange that is concentric with the axis of rotation of the roll, and rotates and moves axially with it. A support 191 has a bifurcated part whose arms 192 extend along and in close proximity to this disc 187, and in these arms are the orifices of conduits corresponding to orifices 139 of FIG. 6. The means of FIG. 6, by which the closeness of the rotating and axially displaceable flange to one or the other of the restricted orifices 139 controls the delivery of lubricating fluid under pressure selectively to the recesses 85 and 86 facing the flange on the shaft to force the flange and its shaft back to initial or intermediate axial position, is employed here in FIGS. 10 and 11, so that by equivalent means the orifices 193 at opposite sides of the flange 187 control the flow of lubricating fluid under pressure to the recesses 181 and 182 to exert fluid pressures against the flange 160 urging it and the shaft back to its initial or intermediate axial position after axial displacement under thrust forces.

The sealing ring 9 in a recess 8 of FIG. 1 is illustrated on an enlarged scale in FIG. 12, and is an example of the sealing rings 8 and 9 of FIGS. 1, 3, of rings 93 of FIG. 4, of the sealing rings used in the recesses 85 and 86 of FIG. 6, and the rings 186 in the recesses 181 of FIG. 10. This ring 9, and the corresponding rings in the other recesses, except for the ring shown in FIG. 2, may be peripherally expandable, like split piston rings for example, toward the peripheral side wall of the recess. An O-ring 194 is confined in an annular recess in the outer periphery of the ring 9 so as to seal the space between the outer periphery of the ring and the peripheral side wall of the recess as the ring moves toward and into contact with the flange 2. The edge face of ring 9, which engages with a face of flange 2, has an annular rib 195 that makes actual contact with the flange 2. This rib 195 has a radial width considerably less than the radial thickness of the ring in cross-section, and preferably is a minor portion of that radial thickness. The fluid pressure within the ring may be heavy yet the fluid pressure outside of rib 195 and below the O-ring 194 (in FIG. 12) is always low. Therefore, the fluid pressure along the face of rib 195, between the rib and the face of the flange 2 against which it is pressed, falls rapidly toward the outer periphery of the ring as shown by the chart of FIG. 13.

The arrows abutting against the faces of the ring 9 in FIG. 12 indicate the directions of the fluid forces acting on the ring, the shorter length arrows indicating the lower pressures, and the fluid pressure fall across the O-ring 194 is shown by the chart in FIG. 14. With the rapid pressure fall across the rib 195 and past the O-ring, the power loss is relatively low and the operating temperature can be controlled and made as low as desired or as selected. The large clearance in each recess filled with lubricating fluid can be designed to support the load for a short time if the fluid flow should fail for any reason. The flow of the lubricating fluid between the rib 195 and the flange provides adequate lubrication and cooling of the bearing surfaces of the rib on the flange 2.

In FIG. 15, the flange 2 of shaft 1 is disposed in front of the recess and is shown by the dot-dash line, and the sealing rings 196 and 197 both are concentric with the shaft 1 and of different diameters so as to form between them one fluid pressure chamber or recess. The larger sealing ring 197 fits in the recess 198 and is sealed therein by an O-ring as in FIG. 12 or by the sealing means of FIG. 2. The inner periphery 199 of the recess 198 is spaced from the shaft, and the ring 196 is as shown and sealed against that wall by the means shown in FIG. 12 or FIG. 2.

The lubricating fluid can be oil, steam, boiler feed water, vapor of mercury, or any other pressurized lubricating fluid. The use of steam or feed water as the lubricant has a particular advantage for deeply submerged submarines because they are available anyway under pressure, which makes unnecessary any provision for supplying another and different lubricating fluid under pressure for taking care of the thrust forces on the propeller shaft. This is a decided advantage because adequate space on a submarine is not readily available. The use of steam or feed water improves reliability by reducing the required number of foreign fluids and their supporting and operating apparatus. While the design can be made to support or generate a movement on the shaft by varying the pressures in the different or individual recesses around the shaft, the pressures in the individual recesses about the shaft are, in the illustrated example, all the same. The rings are all self adjusting and do not require the use of balancing links such as are used in the Kingsbury type. The materials of which the parts are made can be any which are compatible with the lubricating fluid used, and the temperature, speed and pressure at which the device is used. Examples of such materials are cast iron, steel, bronze, plastics, rubber, "Teflon" (a plastic of a tetra-fluroethylene polymer), nylon, and glass filled plastics.

It will be understood that various changes in the details, materials, and arrangements of parts, which have been herein described and illustrated in order to explain the nature of the invention, may be made by those skilled in the art within the principle and scope of the invention, as disclosed herein and as defined in the appended claims.

I claim:

1. An end thrust bearing and control for a rotatable member that is also subject to thrust forces in axial direction, which comprises:
   (a) a rotatable member having peripherally continuous surfaces facing in opposition directions substantially parallel to each other and approximately normal to the axis of rotation of said member,
   (b) a relatively stationary support assembly having faces substantially parallel and close to said members faces but spaced slightly therefrom, and having a recess in each of its said faces with a continuous outer side wall,
   (c) an outwardly expandable sealing ring means in each of said recesses, expandable into contact with said continuous outer side wall and having sealed sliding contact with said outer side wall, said sealing ring means being movable into bearing contact with the adjacent one of said continuous surfaces of said member,
   (d) a source of lubricating fluid under pressure,
   (e) a control valve connected to said source,
   (f) a connection conduit between said control valve and each of said recesses which has therein a shut-off valve operable between open and closed positions,
   (g) mechanical means connecting said shut-off valves for operation together, so that each opens when the other closes,
   (h) follower means responsive to and operated by axial movement of said member for operating said control valve to connect said source to that one of said recesses toward which said member surfaces move when axially displaced due to an axial thrust force on said member, so that fluid under pressure is supplied to said one recess to return said surface to its initial axial position, and
   (i) means for controlling the direction of rotation of said member which is also connected to said mechanical means for opening the shut-off valve in the connection conduit to the recess toward which said member surfaces move for a given rotation.

2. The bearing control according to claim 1, and a conduit with a restricted passage therein connecting said source to each of said recesses and having in series therein a check valve preventing return flow from said recess toward said source through said restricted passage, whereby when direct communication from said source to either recess is cut off by said shut-off valve in the connecting conduit to that recess, said restricted passage will pass fluid under pressure to that recess sufficient to maintain a fluid pressure in that recess adequate to leak continuously past and cool and lubricate the sealing ring means in that recess.

3. The bearing control according to claim 1, wherein said follower means operated by axial movement of said member is amplified the extent of the movement transmitted to said control valve.

4. A thrust bearing for a rotatable member capable of limited axial movement under axial thrust forces, which comprises:
   (a) a rotatable member having a peripheral flange with opposite faces in planes normal to the axis of rotation of the member,
   (b) a relatively stationary element extending along said opposite faces of said flange with faces close and parallel to, but spaced slightly from said faces of said flange,
   (c) said element having in each of its said faces a recess opening toward said flange faces with an outer peripheral side wall,
   (d) an outwardly expanding sealing means in each said recess engaging with said side wall and movable toward and from said flange,
   (e) a source of lubricating fluid under pressure, and
   (f) means activated by axial displacement of said member in response to a thrust force thereon for supplying fluid from said source to that recess toward which said flange moved under said axial displacement, to force said member in an axial direction to return it to its original position before such displacement, leak slowly past the sealing means in that recess to lubricate and cool it, and also for supplying to the other recess at the opposite side of the flange from said that recess a restricted stream of said lubricating fluid from said source which will leak slowly past the sealing means in said other recess sufficiently to press the sealing means in that recess into contact with the flange, lubricate the bearing surfaces between the flange and the sealing means in that other recess, and remove any heat created by the friction of the sealing means on said flange.

5. The bearing according to claim 4, wherein the cross-sectional width of the surface of said sealing means which engages with said flange is a minor fraction of the thickness of the sealing means.

6. A thrust bearing for a rotatable member capable of limited axial movements under axial thrust forces, which comprises:
   (a) a rotatable member having a peripheral flange with its opposite faces in planes approximately normal to the axis of rotation of the member,
   (b) a relatively stationary element having surfaces extending along said opposite faces of said flange, in close proximity to said flange faces, and having a recess with a continuous peripheral side wall in each of its said surfaces that opens toward the flange,
   (c) a sealing ring means in each such recess, expandable outwardly into sealing contact with said peripheral side wall of the recess and movable outward from the recess into contact with the flange of said member,
   (d) and means activated by axial displacement of said member for supplying to the recess of said element toward which said flange moves during any axial displacement, due to thrust forces acting on said member, a lubricating fluid under pressure to force said rotatable member axially in a direction to return said rotatable member to its initial axial position occupied prior to the receipt of said thrust forces and cause leakage of said fluid past the contact surface of the ring means with said flange to lubricate the same and carry off heat generated by the contact of the sealing means with the flange.

7. A thrust bearing for a rotatable member capable of limited axial movements under axial thrust forces which comprises:
   (a) a rotatable member having a peripheral flange with its opposite side faces substantially parallel and approximately normal to the axis of rotation of the member,
   (b) relatively stationary means extending along and in close proximity to but spaced from the opposite side faces of said flange,
   (c) a slide carried by said means adjacent to the periphery of said flange, movable on said means in directions parallel to said axis of rotation, and having a fork straddling the periphery of said flange and causing reciprocation of the slide with reciprocation of said member, (d) said stationary means having recesses with a continuous peripheral wall next to and parallel to the side faces of said flange and opening toward said flange faces, (e) a source of lubricating fluid under pressure, (f) annular sealing means in each of said recesses, engaging the peripheral wall of the recess in which it is placed, and having its outer end face bearing on said flange, and (g) means controlled by said slide for connecting said source alternately to the interior open areas of said recesses at opposite sides of said flange, the connection created by the movement of the slide with said flange, under thrust forces acting on said member in one axial direction, being to the recess within the area encompassed by the sealing means at that side of said flange toward which the flange moved under thrust forces, to thereby exert a fluid pressure upon said flange tending to return the flange, and through it said member, to an intermediate position which the flange and member occupied before said movement under thrust forces started, said means controlled by said slide establishing balanced pressures, from said source, when said flange is in its said intermediate position.

8. The bearing according to claim 7, and means continuously connecting said source, through restricted ports to the recesses at opposite sides of said flange for supplying fluid from said source to recesses at opposite sides of the flange at a slow rate sufficient to cause movement of said fluid out of said recesses and past said sealing means at a restricted rate sufficient to cool and lubricate the bearing between the sealing means and the flange but exerting a pressure in each such recess considerably less than the full pressure that may be created in each recess when said source is connected thereto in response to movements of said slide.

9. A thrust bearing for a rotatable member capable of limited axial movements under axial thrust forces which comprises:

(a) a rotatable member having a peripheral flange with its opposite faces substantially parallel and approximately normal to the axis of rotation of the member, (b) relatively stationary means extending along and in close proximity to but spaced from the opposite side faces of said flange, (c) an element mounted on said stationary means and having a coupling to said member which moves back and forth with axial movements of said member due to action of thrust forces on said member and during rotation of said member, (d) said stationary means having continuous walled recesses in its faces next to and parallel to the side faces of said flange and opening toward said flange faces, (e) a source of lubricating fluid under pressure, (f) annular expandable sealing means in each of said recesses, expandable against the peripheral wall of the recess in which it is placed, and having its outer end face bearing on said flange, and (g) means controlled by said element, movement for connecting said source alternately to the interior open areas of said recesses at opposite sides of said flange and creating maximum fluid pressure in that recess toward which the flange moved under a thrust force on said member, for returning under said fluid pressure said member, with its flange, to an intermediate position it occupied before such movement under a thrust force started.

10. The bearing according to claim 9, and means for continuously connecting said source through a restricted passage to the recesses at both faces of said flange and thereby supplying said fluid to each recess under a fluid pressure that will cause leakage between said flange and said sealing means sufficient to cool and lubricate the bearing of the sealing means on said flange, but considerably less than the fluid pressure in that recess when the source is connected to it by said means which is controlled by said element.

11. A thrust bearing device in which a rotatable member is subject to limited axial movements in both directions under axially acting thrust forces thereon, which comprises:

(a) a rotatable member, (b) a source of lubricating fluid under pressure, (c) means for applying a fluid pressure to said member and urging it in one of its axial directions, (d) means for applying a fluid pressure to said member and urging it in the other of its axial directions, (e) a reversing valve connected to a source and to each of said pressure applying means and operable to connect said source alternately to said pressure applying means and when in an intermediate position to disconnect both of said pressure applying means from said source, and (f) means controlled by an axial movement of said member for operating said reversing valve in a direction to connect said source to that pressure applying means which urges said member for movement in a direction opposite to that of said an axial movement until said member is in its said intermediate position.

12. The device according to claim 11, wherein said last recited means includes a pilot operated fluid system supplied with pressure from said source and controlled by said member in its axial movements for causing operations of said reversing valve.

13. In a thrust bearing device in which a rotatable member is subject to limited axial movements in both directions under axially acting thrust forces thereon, which comprises:

(a) said member having opposed faces normal to its axis of rotation, (b) a relatively stationary support having portions disposed parallel, and in close proximity to, but spaced from said opposed faces of said member, (c) said support having at least one recess in each portion facing each of said opposed faces of said member, (d) a sealing ring in each such recess movably sealed to the outer peripheral wall of that recess for movement under fluid pressure in that recess into bearing contact with the adjacent said face of said member, (e) each said ring having a radial cross-sectional width in its face bearing on said adjacent face of said member, which is a minor fraction of the total radial, cross-sectional thickness of said ring, and (f) means controlled by said member in each of its said axial movements for applying fluid pressure from said source to that recess where the fluid pressure therein urges said member to have an axial movement opposite from that of any such axial displacement of said member which causes operation of said last-mentioned means.

14. A thrust bearing useful for a rolling mill shaft which is subject to limited axial movements under axially acting thrust forces, which comprises:

(a) said shaft having outwardly tapered ends, (b) a sleeve fitting and fixed upon each tapered end for rotation therewith and having a cylindrical periphery as a bearing surface, and also having a peripheral flange adjacent its outer end with its faces approximately normal to (c) a housing having a bifurcated part extending along, in close proximity to, but spaced from said faces of said flange, (d) said bifurcated part having at least one recess in each of its surfaces facing said flange and opening toward said flange, (e) sealing rings in each such recess sealed to but slidable along the side wall of such recess, into bearing contact with said flange faces of said member and urged into contact with said flange by fluid pressure in that recess, (f) a source of lubricating fluid under pressure, and (g) means responsive to an axial displacement of said member in either direction for connecting said source to the recess in the bifurcated part of said housing toward which the flange was displaced during such axial displacement of said member for applying a fluid force on said flange in a direction to return it to its position occupied before such displacement.

15. A thrust bearing assembly, comprising:

(a) a rotatable member having two spaced faces which are substantially normal to the axis of rotation of said member and facing in opposite directions;

(b) a fixed support assembly having a surface disposed immediately adjacent each of said faces;

(c) seal means disposed between said faces and said surfaces so that a sealed fluid holding chamber is formed adjacent each of said faces;

(d) fluid supply means for conducting fluid under pressure to said chambers, and including control valving for directing fluid to one pressure chamber or the other;

(e) a follower means connected to said member and to said control valving for activating said valving upon axial displacement of said member; and (f) pilot means connected to said follower and to said valving to provide adjustment of fluid pressure for minimizing over-correction of the position of said rotating member.

16. A bearing device in which a rotatable member is subject to limited axial movements under axially acting thrust forces which comprises:

(a) a rotatable member having opposed faces that are normal to its axis of rotation, (b) a relatively stationary element having faces along in close proximity to, but spaced from, said faces of said member, and having a recess in each of its faces opening toward said opposed faces, (c) sealing means in each such recess sealed to but slidable along the side wall of such recess into bearing contact with said opposed faces of said member under fluid pressure in that recess, (d) a source of lubricating fluid under pressure, (e) means activated by axial displacement of said member in response to a thrust force thereon, for supplying fluid under high pressure from said source to that recess toward which one of said opposed faces of said members is moved in such displacement, to thereby force said member back to an intermediate axial position which it occupied prior to the application of a displacing thrust force, said means also supplying lubricating fluid to the other recess at a pressure considerably less than the high pressure applied to the first recess, and (f) movement-multiplying means activated by axial displacement of said member, (g) said means including movement-multiplying means operatively connected to said member, and valve means connected to said multiplying means and to said source for controlling the delivery of said fluid under pressure to said recesses.

17. A bearing device in which a rotatable member is subject to limited axial movements under axially acting thrust forces, which comprises:

(a) a rotatable member, (b) a source of lubricating fluid under pressure, (c) means operated by said source for imparting forces on said member in opposite axial directions, (d) means selectively controlling the direction of said forces and their activation by said preceding means, (e) means responsive to axial movements of said member for activating said preceding means to cause application from said first means of forces opposing the axial movement of said member from its initial position, and (f) the said activating means being hydrostatically responsive to relative axial movements of said member and operative through a servo-motor upon said controlling means.

18. A bearing device in which a rotatable member is subject to limited axial movements under axially acting thrust forces which comprises:

(a) a rotatable member, (b) a source of lubricating fluid under pressure (c) means operated by said source for imparting forces on said member in opposite axial directions, (d) means selectively controlling the direction of said forces and their activation by said preceding means, (e) means responsive to axial movements of said member for activating said preceding means to cause application from said first means of forces opposing the axial movement of said member from its initial position; and (f) the controlling means having a pilot control for said first means and said means being responsive to axial movements of said member to operate said pilot control.

19. A thrust bearing device in which a rotatable member is subject to limited axial movements in both directions under axially acting thrust forces thereon, which comprses:

(a) a rotatable member, (b) a source of lubricating fluid under pressure, (c) means for applying fluid pressure to said member in one of its opposite axial directions, (d) means for applying fluid pressure to said member in the other of its said opposite axial direction, (e) means for connecting said source alternately to said fluid pressure applying means, and also for disconnecting said source from both of said fluid pressure applying means, (f) means operable when said member moves axially from intermediate position for operating said connecting means to connect said source to that fluid pressure applying means which urges said member in the axial direction that will return it to its initial intermediate position and disconnects said source from both said pressure applying means when that position is reached, and (g) restricted conduit means also connecting said source to each of said pressure applying means for continuous delivery thereto of fluid under pressure sufficient to cause slow leakage through each pressure applying means and cool and lubricate it when it is otherwise disconnected from said source.

20. A thrust bearing assembly, comprising:

(a) a rotatable member having two spaced faces which are substantially normal to the axis of rotation of said member and face in opposite directions, (b) a fixed support assembly having a surface disposed immediately adjacent to each of said faces, (c) seal means disposed between said faces and said surfaces so that a sealed fluid holding chamber is formed adjacent each of said faces, (d) fluid supply means for conducting fluid under pressure through said chambers, and including control valving for directing fluid to one pressure chamber or the other, (e) a follower means connected to said member and to said control valving for activating said valving upon axial displacement of said member, and (f) movement-multiplier means forming a part of said follower means for magnifying the axial movement of said member so that a larger mechanical movement is transmitted to the said control valving.

21. The thrust bearing assembly as set forth in claim 20 wherein said movement-multiplier means includes a mechanical linkage system.

22. A thrust bearing assembly, comprising:
   (a) a rotating member,
   (b) a fluid pressure system,
   (c) a first fluid pressure chamber connected to said system and to said rotating member which exerts an axial force on said member in a given axial direction,
   (d) a second fluid pressure chamber connected to said system and to said rotating member which exerts an axial force on said member in an opposite axial direction to that of said first fluid pressure chamber,
   (e) a control valve means separately connected to each of said fluid pressure chambers and connected to said fluid supply system for directing fluid pressure to said fluid pressure chambers alternately or simultaneously to control the axial movement of said rotating member, and
   (f) means connected to said member and to said control valve for activating said control valve upon axial movement of said rotating member, said means including movement, multiplier means.

23. A thrust bearing assembly, comprising:
   (a) a rotatable member having two spaced faces which are substantially normal to the axis of rotation of said member and face in opposition directions;
   (b) a fixed support assembly having a surface disposed immediately adjacent to each of said faces,
   (c) seal means disposed between said faces and said surfaces so that a sealed fluid holding chamber is formed adjacent to each of said faces,
   (d) a central control valve connected to a high pressure fluid source and separately connected to each of said fluid holding chambers,
   (e) a follower connected to said central control valve and engaging said rotatable member, so that axial displacement of said member will cause the follower to move and thereby activate the central control valve to supply high fluid pressure to one or the other of said fluid holding chambers,
   (f) a fluid supply means for maintaining a minimum fluid pressure in each of said fluid holding chambers,
   (g) a shut-off valve in each of said separate fluid supply lines between said fluid holding chambers and said control valve,
   (h) a motor control member which controls the direction of rotation of said rotatable member and which is connected to both of said shut-off valves so that when the motor control member is moved to cause a given direction of rotation for said rotatable member, one of said valves is opened, and the other of said valves is closed to permit fluid under pressure to be supplied directly to the desired fluid chamber while closing off the fluid supply line to the other fluid holding chamber.

24. A thrust bearing assembly, comprising:
   (a) a rotatable member having two spaced surfaces which are substantially normal to the axis of rotation of said member and face in opposite directions,
   (b) a fixed support assembly having a pair of surfaces, one adjacent each of said faces and having a continuous walled recess therein;
   (c) seal means disposed within said recesses and having the outer periphery thereof in engagement with said continuous wall,
   (d) fluid supply means for conducting fluid under pressure to said chambers, and including control valving for directing fluid to one pressure chamber or the other,
   (e) a follower means connected to said chamber and to said control valving for activating said valving upon axial displacement of said member, and
   (f) said seal means being movable outwardly along the said continuous wall of the recess to engage the opposed face of the rotatable member,
   (g) said seal having a substantially greater surface at the rear thereof than at the outward surface thereof exposed to fluid pressure from said chamber, so that said seal is forced outwardly by said fluid pressure into engagement with said face of said rotatable member.

References Cited in the file of this patent
UNITED STATES PATENTS

| 303,813 | Cousins | Aug. 19, 1884 |
| 624,497 | Inglis | May 9, 1899 |